United States Patent
Shopoff et al.

(10) Patent No.: US 12,091,032 B2
(45) Date of Patent: Sep. 17, 2024

(54) ENGINE SOUND ENHANCEMENT DURING TOWING

(71) Applicant: Toyota Motor Engineering & Manufacturing North America, Inc., Plano, TX (US)

(72) Inventors: Scott W. Shopoff, Ypsilanti, MI (US); Michael U. Frank, Saline, MI (US); Keita Okamoto, Novi, MI (US); Luis Miyar Alvarez, Farmington Hills, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 237 days.

(21) Appl. No.: 17/886,018

(22) Filed: Aug. 11, 2022

(65) Prior Publication Data
US 2024/0051561 A1 Feb. 15, 2024

(51) Int. Cl.
| | |
|---|---|
| *G10K 11/175* | (2006.01) |
| *B60T 8/17* | (2006.01) |
| *B60W 50/14* | (2020.01) |
| *G10K 11/178* | (2006.01) |
| *G10K 15/04* | (2006.01) |
(Continued)

(52) U.S. Cl.
CPC ........... *B60W 50/14* (2013.01); *B60T 8/1708* (2013.01); *G10K 15/04* (2013.01); *H04R 1/025* (2013.01); *H04R 3/00* (2013.01); *H04R 2430/01* (2013.01); *H04R 2499/13* (2013.01)

(58) Field of Classification Search
CPC ............. G10K 11/175; G10K 11/1752; G10K 11/178–17885; G10K 2210/128; G10K 2210/1282; G10K 2210/12821; G10K 2210/12822
See application file for complete search history.

(56) References Cited

U.S. PATENT DOCUMENTS

| | | | |
|---|---|---|---|
| 5,758,311 A * | 5/1998 | Tsuji ................ | G10K 11/17883 701/111 |
| 8,320,581 B2 | 11/2012 | Hara et al. | |
| 8,542,844 B2 | 9/2013 | Bowden et al. | |
(Continued)

OTHER PUBLICATIONS

Boussard et al., *Implementing digital engine sound enhancement techniques to define and refine vehicle interior sound image/quality*, Sep. 2013, 10 pages, inter noise 2013, Innsbruck, Austria.

*Primary Examiner* — Erick R Solis
(74) *Attorney, Agent, or Firm* — Snell & Wilmer LLP

(57) ABSTRACT

Methods, systems, devices and apparatuses for a sound enhancement system. The sound enhancement system includes a trailer brake control unit placed on the vehicle and an electronic control unit coupled to the trailer brake control unit. The electronic control unit is configured to determine the vehicle is operating in a tow mode based on the trailer brake status, determine a magnitude of an audio signal that mimics or enhances engine sound based on the tow mode, and generate the audio signal. The sound enhancement system further includes an audio device configured to output the audio signal based at the determined magnitude.

20 Claims, 6 Drawing Sheets

(51) Int. Cl.
*H04R 1/02* (2006.01)
*H04R 3/00* (2006.01)

(56) References Cited

U.S. PATENT DOCUMENTS

| | | |
|---|---|---|
| 8,542,846 B2 | 9/2013 | Matejcyk et al. |
| 8,938,079 B2 | 1/2015 | Valeri et al. |
| 9,365,158 B2 | 6/2016 | Barlow, Jr. et al. |
| 9,682,652 B2 | 6/2017 | Bailey, III et al. |
| 9,686,611 B2 | 6/2017 | Violi et al. |
| 9,981,617 B1 | 5/2018 | MacDonald et al. |
| 10,071,686 B2 | 9/2018 | Reilly et al. |
| 10,190,683 B2 | 1/2019 | Kikkawa et al. |
| 10,766,479 B2 | 9/2020 | Galang |
| 11,027,648 B2 | 6/2021 | Harper et al. |
| 2004/0156514 A1 | 8/2004 | Fletcher et al. |
| 2018/0190258 A1* | 7/2018 | Mohammad ............ G10L 15/02 |
| 2021/0201885 A1 | 7/2021 | Bastyr et al. |
| 2023/0100827 A1* | 3/2023 | Zhou .................... B60W 40/06 701/26 |

* cited by examiner

ENGINE SOUND ENHANCEMENT DURING TOWING

BACKGROUND

Field

This disclosure relates to a system, method, apparatus and/or device to output a natural engine sound of a vehicle.

Description of the Related Art

As vehicles become more fuel efficient, engine noise has decreased significantly. Engine noise, however, may be a desirable characteristic to some vehicle owners. Some drivers want the torque and fuel efficiency of a newer and better engine, but also want to keep the classic sound of an older gas combustion engine. This presents various challenges, and vehicle manufacturers must work to distinguish and suppress some types of noise but allow and even enhance other types of noises.

An Engine Sound Enhancement System (ESE) enhances or amplifies the vehicle's engine and exhaust sounds using the audio system and/or a separate speaker inside the vehicle. The sounds may or may not be pre-recorded. The sounds may further enhance the sounds the vehicle makes to get the satisfaction of hearing the mechanics growl when the vehicle accelerator pedal is depressed. This gives the driver a better feel for the engine and helps the driver shift by sounds heard by the driver's ears.

Current Engine Sound Enhancement (ESE) systems do not take a towing or trailering scenario into consideration. This can create an unnatural engine sound during such events. Accordingly, there is a need for a system, apparatus and/or method to improve the operation of a sound enhancement system to better mimic or enhance the engine sound of the vehicle during a towing event so that the engine sound is more natural.

SUMMARY

In general, one aspect of the subject matter described in this disclosure may be embodied in an engine sound enhancement system ("sound enhancement system or ESE system"). The sound enhancement system includes a trailer brake sensor an electronic control unit coupled to the trailer brake sensor. The trailer brake sensor is configured to determine a trailering load coupled to the vehicle. The electronic control unit is configured to determine the vehicle is operating in a tow mode based on the trailer brake sensor, determine a magnitude of an audio signal that mimics or enhances engine sound based on the tow mode, and generate the audio signal. The sound enhancement system further includes an audio device (e.g., a speaker) configured to output the audio signal based at the determined magnitude.

In one aspect, an engine sound enhancement system for a vehicle includes a trailer brake sensor configured to detect a tow status placed on the vehicle, an airflow sensor configured to measure an airflow into an engine of the vehicle, and an electronic control unit coupled to the trailer brake sensor and the airflow sensor. The electronic control unit is configured to determine a magnitude of an audio signal that mimics or enhances engine sound of the vehicle to be outputted based on the tow status and the airflow into the engine, determine a timing of when to output the audio signal based on the airflow into the engine of the vehicle, and generate the audio signal based on the determined magnitude. The engine sound enhancement system further includes a speaker positioned within an interior of the vehicle and configured to output the audio signal based on the timing of when to output the audio signal.

In one aspect, a method for outputting an engine sound includes determining, by a trailer brake control unit, a vehicle is operating in a tow mode, determining, by a processor, a magnitude of an audio signal that is to be generated and that mimics or enhances engine sound of the vehicle based on the tow mode, generating, by the processor, the audio signal based on the determined magnitude, and outputting, via a speaker positioned within an interior of the vehicle, the generated audio signal.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses, and methods for an engine sound enhancement system (or "sound enhancement system or ESE system") that enhances the sound or other audio generated to mimic the engine sound of the vehicle while towing, or trailering. The sound enhancement system creates a more natural feeling of the engine sound for various driving patterns. For instance, the sound enhancement system may adjust the sound output based on a tow mode. In response to the tow mode, an output sound level of the sound enhancement system is modified based on a trailer brake control (TBC) parameter selection. Particularly, the sound enhancement system allows for the output sound level of the sound enhancement system to be adjustable based on or due to trailer brake gain, times, speeds, gears, and/or intervals. By changing the main input that is used to generate the audio signal in response to the tow mode, the sound enhancement system better matches or synchronizes with the vehicle behavior, such as an acceleration or exertion of the vehicle while towing, and creates a more natural feeling engine sound during towing.

Figure 1A:
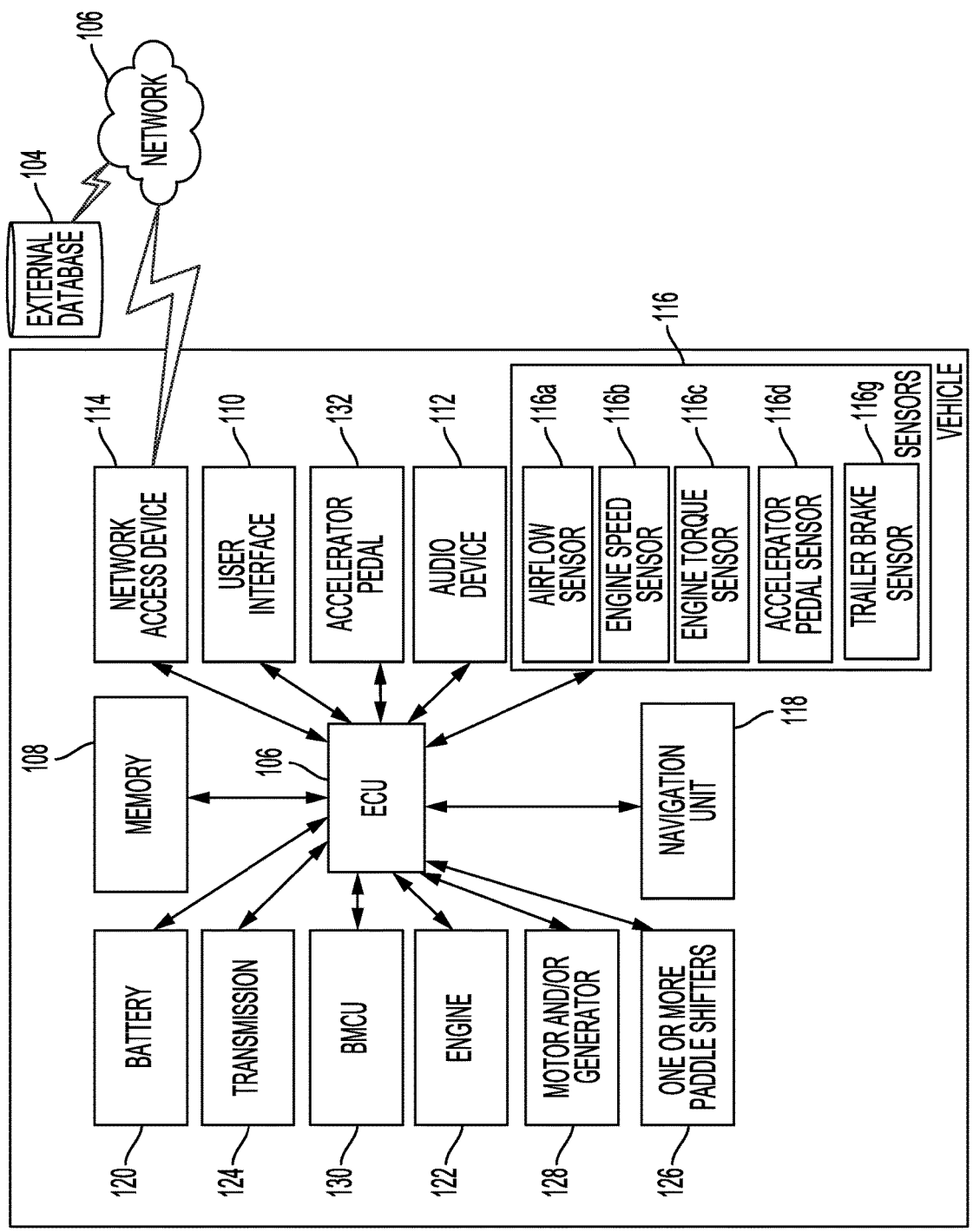
FIG. 1A is a block diagram of an engine sound enhancement system according to an aspect of the invention.

FIG. 1A is a block diagram of an engine sound enhancement system (or "sound enhancement system or ESE system") 100. The sound enhancement system 100 or a portion thereof may be retro-fitted, coupled to, include or be included within a vehicle 102 or separate from the vehicle 102. The sound enhancement system 100 may use one or more vehicle components of the vehicle 102 to output audio that mimics engine sounds within the interior of the vehicle 102. The sound enhancement system 100 may include or be coupled to an internal or external database 104.

The sound enhancement system 100 may have or use a network 134 to communicate among different components, such as among the vehicle 102 and/or the database 104. The network 134 may be a Dedicated Short-Range Communication (DSRC) network, a local area network (LAN), a wide area network (WAN), a cellular network, the Internet, or combination thereof, that connects, couples and/or otherwise communicates among the different components of the sound enhancement system 100.

The sound enhancement system 100 may include or be coupled to the database 104. A database is any collection of pieces of information that is organized for search and retrieval, such as by a computer, and the database may be organized in tables, schemas, queries, reports, or any other data structures. A database may use any number of database management systems. The database 104 may include a third-party server or website that stores or provides information. The information may include real-time information, periodically updated information, or user-inputted information. A server may be a computer in a network that is used to provide services, such as accessing files or sharing peripherals, to other computers in the network. The database 104 may be located inside the vehicle 102.

The database 104 may include a sound database. The sound database may include various sounds, which may be downloaded by the sound enhancement system 100. The sound enhancement system 100 may play or use various sounds or audio (hereinafter, referred to as "audio") to mimic or enhance the engine sound. The audio to be used to mimic the engine sound may be based on the type or kind of the vehicle 102. The sound database may also include a mapping or an association between a value indicative of the volume to be outputted and a magnitude of an audio signal to be generated. This allows the user to configure the audio that is generated to be used to mimic or enhance the engine sound.

The sound enhancement system 100 may include, be included within or be retro-fitted to the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

Figure 1B:
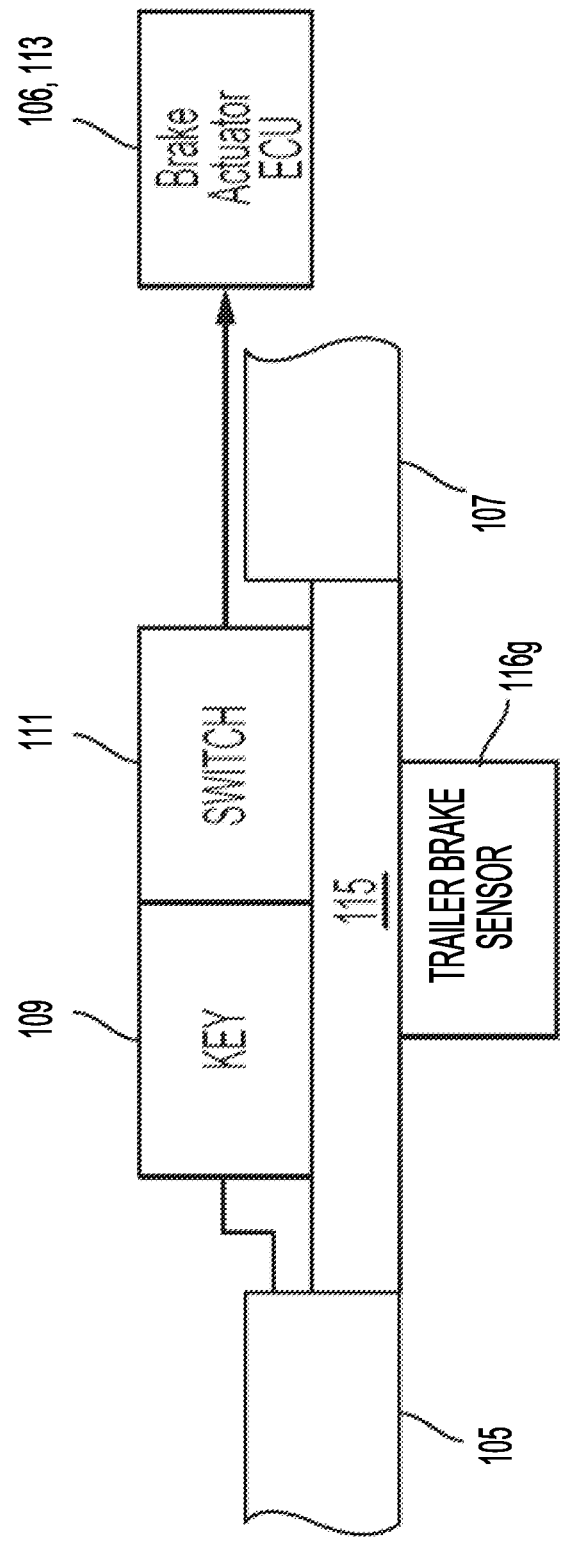
FIG. 1B is a block diagram of the vehicle of FIG. 1A configured as a towing vehicle according to an aspect of the invention.

Referring briefly to FIG. 1B, in various embodiments, the vehicle 102 may be configured to tow (e.g., be configured as a towing vehicle 105) another vehicle, trailer, etc. (e.g., a towed vehicle 107). A towing rod or bar 115 may be used to secure and attach the towing vehicle 105 to the towed vehicle 107. The towing vehicle 105 may have a bumper and/or a connector that is used to connect the towing vehicle 105 to the towing rod or bar 115, which is connected to a bumper and/or a connector of the towed vehicle 107. In various aspects, the towing vehicle 105 may be a motorhome or a recreational vehicle (RV), for example, configured to tow a towed vehicle (e.g., a sports utility vehicle (SUV)) where the towed vehicle is being flat towed (i.e., all wheels are on the ground). A key 109 and a switch 111 are coupled to the towing rod or bar 115 and the combination is used to detect whether the towed vehicle 107 becomes disconnected from the towing vehicle 105. In one embodiment, the key 109 is inserted into the switch 111 (e.g., a break-away switch) and mechanical and electrical connections are established. The key 109 is connected to the towing vehicle 105 or the towed vehicle 107 via a wire, cord or rope. The switch 111 is connected to the towed vehicle 107 or the towing vehicle 105 via a wire, cord or rope. When the towed vehicle 107 becomes separated or disconnected from the towing vehicle 105, the key 109 breaks off or becomes disconnected from the switch 111 and closes an electrical circuit of the switch 111. Accordingly, an electronic control unit (e.g., electronic control unit 106 described herein) receives a signal indicative of the connection (or disconnection) between the towing vehicle 105 and the towed vehicle 107.

Referring again to FIG. 1A, the sound enhancement system 100 includes one or more processors, such as the electronic control unit (ECU) 106. The one or more processors, such as the ECU 106, may be implemented as a single processor or as multiple processors. For example, the one or more processors may be a microprocessor, data processor, microcontroller or other controller, and may be electrically coupled to some or all the other components within the vehicle 102. The one or more processors may obtain sensor data from one or more sensors to determine when to output the audio that mimics or enhances the engine sound. The sound enhancement system 100 may output the audio into an interior of the vehicle 102. By generating and outputting the audio into the interior of the vehicle 102, the sound enhancement system 100 creates the desired aural experience of hearing the mechanics growl when the vehicle 102 is in a tow mode. This gives the driver a better feel for the engine 122 and helps the driver operate the vehicle 102 by ear.

The memory 108 may be coupled to the ECU 106. The memory 108 may include one or more of a Random Access Memory (RAM), a Read Only Memory (ROM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106. The memory 108 may store a mapping that between a value indicative of the volume of the audio to be outputted and a magnitude of the audio signal that is generated to mimic or enhance the engine sound. The memory 108 may also store the audio and/or audio signals.

The sound enhancement system 100 may include a user interface 110. The user interface 110 may be part of the vehicle 102 or a vehicle head unit (not shown). The user interface 110 may include an input device that receives user input from a user interface element, a button, a dial, a microphone, a keyboard, or a touch screen. The user interface 110 may provide an interface for a user to provide user input. The user input may include one or more configuration settings. The one or more configuration settings may indicate an amount of delay to output the audio so that the audio matches the vehicle behavior, e.g., the engine torque or speed, to create a more a natural sound when the engine is in the tow mode. The amount of delay may be a threshold, such as an amount of airflow or a rate of the airflow into the engine of the vehicle 102 that would cause the engine to move the wheels of the vehicle 102.

The user interface 110 may include, provide or be coupled to an output device, such as the audio device 112 or a separate speaker(s). The audio device 112 may be a speaker or other audio indicator. The audio device 112 may be positioned within an interior of the vehicle 102. The user interface 110 may include or provide other output devices, such as a display or other visual indicator. The user interface 110 may provide notifications, warnings or alerts, for example.

The sound enhancement system 100 may include a network access device 114. The network access device 114 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 114 may transmit data to and receive data from the different components besides the sound enhancement system 100, such as the vehicle 102 and/or the database 104.

The sound enhancement system 100 may include one or more sensors 116. The one or more sensors 116 may include an airflow sensor 116a, an engine speed sensor 116b, an engine throttle sensor 116c and/or an accelerator pedal sensor 116d. The airflow sensor 116a may be positioned at an air inlet of the engine 122 and measure an amount of airflow and/or a rate of the airflow into the engine 122. The engine speed sensor 116b may measure a rotation speed of the crankshaft of the engine 122. The engine speed sensor 116b may measure the revolutions per minute (RPM) of the rotation of the engine crankshaft. The engine throttle sensor 116c may measure or determine the throttle position to determine the engine load. The accelerator pedal sensor 116d may be coupled to the accelerator pedal 132. The accelerator pedal sensor 116d may measure, detect or determine a position of the accelerator pedal 132 to determine the amount that the accelerator pedal 132 of the vehicle 102 is depressed. The one or more sensors 116 may include an engine torque sensor 116e. The engine torque sensor 116e may measure or determine the torque or the rotational force on the engine 122. The one or more sensors 116 may include one or more other sensors, such as a shift position sensor 116f to detect the shift position or the gear position (i.e., which gear) of the transmission 124.

The one or more sensors 116 may include a trailer brake sensor 116g. The trailer brake sensor 116g may be attached to the towing rod or bar 115. The trailer brake sensor 116g is configured to determine the vehicle 102 is operating in a tow mode. Towing information associated with the tow mode can include size of towed load (e.g., mass being trailered, trailering load) and type of brakes being used by the trailer. For instance, the trailer brake sensor may detect how much load is being placed on the towing rod or bar 115, whether the braking of the towed vehicle 107 should be increased, decreased or is correct, and whether the key 109 is connected to or has been disconnected from the switch 111 indicating that the towed vehicle 107 has been disconnected from the towing vehicle 105. In response to the switch 111 becoming disconnected from the key 109, the ECU 106 receives a signal indicating that the towed vehicle 107 may be disconnected from the towing vehicle 105. In addition, the display or interface 110 displays a message that the "towed vehicle may be disconnected from the towing vehicle." The trailer brake sensor 116g is wirelessly or wire connected to the ECU 106.

The ECU 106 (which also be referred to as a Trailer Brake Control Unit (TBCU)) may further include a brake actuator 113. The brake actuator 113 may be configured to receive a brake signal from the ECU 106. The brake signal indicates the amount of brake pressure (e.g., hydraulic pressure) that the brake actuator 113 should apply to the brakes of the towing vehicle 105, which in turn slows down the wheels of the towing vehicle 105. As such, the ECU 106, or TBCU, is configured to determine a trailer brake gain. For instance, the brake actuator 113 and the trailer brake sensor 116g are used to determine the trailer brake gain (e.g., the amount of force that the brake will be applied on the trailer) and the ECU 106 can adjust the trailer brake gain accordingly (e.g., the higher the gain of the brakes, the harder the TBCU will command the brakes to work). In various aspects, the trailer brake gain may be set manually (e.g., physically adjusting the mechanism), automatically (e.g., default vehicle settings), and/or via the user interface 110).

The sound enhancement system 100 may be coupled to one or more vehicle components of the vehicle 102. The one or more vehicle components may include a navigation unit 118. The navigation unit 118 may be integral to the vehicle 102 or a separate unit. The vehicle 102 may include a Global Positioning System (GPS) unit (not shown) for detecting location data including a current location of the vehicle 102 and date/time information instead of the navigation unit 118. In some implementations, the ECU 106 may perform the functions of the navigation unit 118 based on data received from the GPS unit. The navigation unit 118 or the ECU 106 may perform navigation functions. Navigation functions may include, for example, route and route set prediction, providing navigation instructions, and receiving user input such as verification of predicted routes and route sets or destinations. The navigation unit 118 may be used to obtain navigational map information. The navigational map information may include a starting location of the vehicle 102, a current location of the vehicle 102, a destination location, a route between the starting location of the vehicle 102 and the destination location and/or date/time information.

The one or more vehicle components may include a motor and/or generator 128. The motor and/or generator 128 may convert electrical energy into mechanical power, such as torque, and may convert mechanical power into electrical energy. The motor and/or generator 128 may be coupled to the battery 120. The motor and/or generator 128 may convert the energy from the battery 120 into mechanical power, and may provide energy back to the battery 120, for example, via regenerative braking. The one or more vehicle components may include one or more additional power generation devices, such as an engine 122 or a fuel cell stack (not shown). The engine 122 combusts fuel to provide power instead of and/or in addition to the power supplied by the motor and/or generator 128.

The battery 120 may be coupled to the motor and/or generator 128 and may supply electrical energy to and receive electrical energy from the motor and/or generator 128. The battery 120 may include one or more rechargeable batteries and may supply the power to the sound enhancement system 100.

The battery management control unit (BMCU) 130 may be coupled to the battery 120 and may control and manage the charging and discharging of the battery 120. The BMCU 130, for example, may measure, using battery sensors, parameters used to determine the state of charge (SOC) of the battery 120. The BMCU 130 may control the battery 120.

The one or more vehicle components may include a transmission 124. The transmission may have one or more gears, a drivetrain, a clutch and/or a drive shaft. The transmission 124 converts the power from the engine 122 to move the wheels of the vehicle 102. The one or more vehicle components may include one or more paddle shifters 126. The one or more paddle shifters may adjust a shift position of the gears within an automatic transmission. The one or more paddle shifters 126 may be manually depressed, pushed, pulled or otherwise positioned to manually change gears of the transmission 124 electrically.

Figure 2:
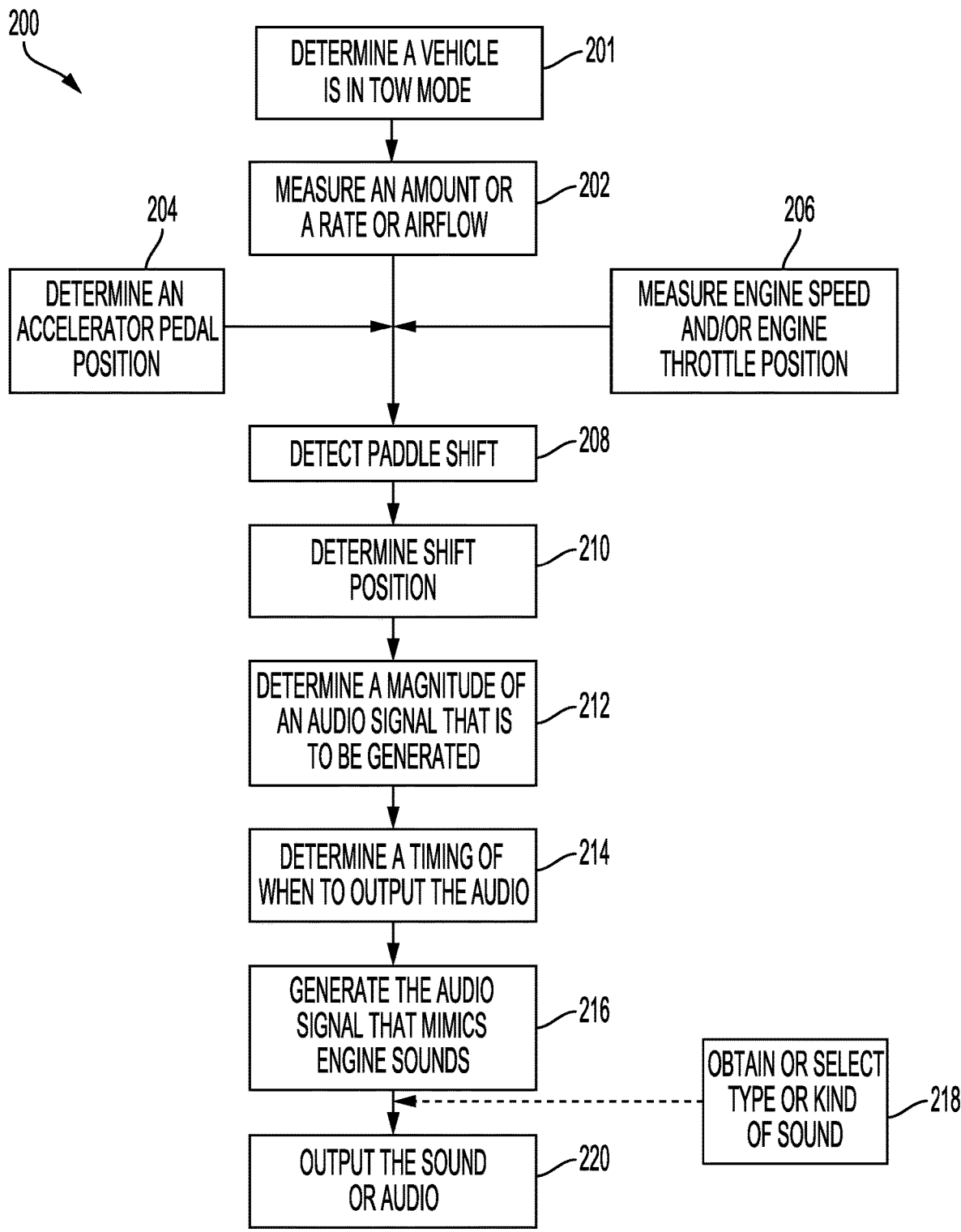
FIG. 2 is a flow diagram of an example process for outputting audio that mimics or enhances the engine sound of the vehicle into an interior passenger cabin of the vehicle using the engine sound enhancement system of FIG. 1 according to an aspect of the invention.

FIG. 2 is a flow diagram of a process 200 for outputting audio that mimics or enhances the engine sound of the vehicle 102. One or more computers or one or more data processing apparatuses, for example, the ECU 106 of the sound enhancement system 100 of FIG. 1, appropriately programmed, may implement the process 200. The sound enhancement system 100 may be used to generate and/or output an audio signal that mimics or enhances the engine sound of the vehicle 102. The sound enhancement system 100 can be implemented on electric vehicles, which do not have an engine or a transmission. The sound enhancement system 100 may generate the audio signal and/or further enhance an existing engine sound of the vehicle 102, e.g., by amplifying the magnitude of the existing engine sound of the vehicle 102 or by providing audio that increases the volume of the engine sound of the vehicle 102. The sound enhancement system 100 may use various sensor data, such as the amount or the rate of airflow, the engine speed, the throttle position, the engine torque, the accelerator pedal position, the trailer brake sensor and/or a combination thereof, to generate the audio signal that mimics or further enhances the engine sound of the vehicle 102.

The sound enhancement system 100 can also predict or have stored sounds based on internal combustion vehicles such that the sound mimics another vehicle. For example, the sound enhancement system 100 on an electric vehicle can be configured or programmed to mimic the sounds produced from an internal combustion engine vehicle. As an example, the electric vehicle can generate internal engine sounds that are similar to the internal engine sounds heard by a driver of the internal combustion engine vehicle. This can be done, for example, by determining the speed of the internal combustion engine vehicle and internal sound produced inside the internal combustion engine at various speeds and producing the same, similar or enhanced engine sounds inside the electric vehicle.

The sound enhancement system 100 determines whether the vehicle 102 is in tow mode (201). The sound enhancement system 100 may use one or more sensors 116, such as the trailer brake sensor 116g, to determine the vehicle 102 is connected to a towed vehicle. In response to determining tow mode is activated, the output sound level of the sound enhancement system 100 is modified based on a trailer brake control (TBC) parameter selection (e.g., a trailer brake gain). The sound enhancement system 100 is configured to adjust the output sound level based on trailer brake gain at different trailer brake gains, times, speeds, and/or intervals. Accordingly, by adding the additional tow input generates a more natural and higher quality Engine Sound Enhancement during towing.

The sound enhancement system 100 obtains or measures an amount or a rate of the airflow into the engine 122 of the vehicle 102 (202). The sound enhancement system 100 may use one or more sensors 116, such as the airflow sensor 116a, to measure the amount or the rate of the airflow into the engine 122 of the vehicle 102. The airflow sensor 116a may be positioned near or in proximity to an air inlet of the engine 122 and measure the airflow over a period. The airflow sensor 116a may detect the amount or the rate of the airflow that enters the engine 122. The sound enhancement system 100 may use the amount or the rate of the airflow to determine a timing of when to output the audio to mimic or enhance the engine sound and a volume of the audio to be outputted.

Other sensor data may be collected to assist to enhance or mimic the engine sound of the vehicle 102. The sound enhancement system 100 may determine a position of the accelerator pedal 132 of the vehicle 102 (204). The sound enhancement system 100 may use the accelerator pedal sensor 116d to determine the position of the accelerator pedal 132. The accelerator pedal sensor 116d may be coupled to the accelerator pedal 132 and may measure the amount and/or rate that the accelerator pedal 132 is depressed and/or released and/or the position of the accelerator pedal 132. The position of the accelerator pedal 132 and/or the amount and/or rate that the accelerator pedal 132 is depressed and/or released may affect the magnitude of the audio signal, and consequently the volume of the audio that is outputted. As an accelerator pedal 132 is depressed further, the engine 122 is further revved, and thus, the audio associated with the engine 122 should be louder. Consequently, the sound enhancement system 100 may increase the magnitude of the audio signal to mimic the engine sound that is representative of the engine 122 that is further revved, and similarly, the sound enhancement system 100 may decrease the magnitude of the audio signal when the accelerator pedal 132 is released.

The sound enhancement system 100 may measure or detect the engine speed, the engine torque and/or the engine throttle position (206). The sound enhancement system 100 may use an engine speed sensor 116b to measure the rotation speed of the engine crankshaft. For example, the sound enhancement system 100 may measure the revolutions per minute (RPM) of the engine crankshaft to measure or determine the engine speed. The sound enhancement system 100 may use an engine throttle sensor 116c to determine the engine throttle position of the vehicle 102, such as when the throttle is open, partially open and/or closed and the degree that the throttle is open or partially opened. The sound enhancement system 100 may use an engine torque sensor 116e to measure or determine the rotational force or torque on the engine 122. The engine speed, the engine torque and/or the engine throttle position may be used to determine the magnitude of the audio signal to be generated to mimic the engine sound of the vehicle 102.

The sound enhancement system 100 may detect a paddle shift (208). The sound enhancement system 100 may detect when the one or more paddle shifters 126 are depressed, pushed, pulled or otherwise toggled. The sound enhancement system 100 may detect which of the one or more paddle shifters 126 are depressed, pushed, pulled or otherwise toggled to upshift or downshift the shift position of the gears of the transmission 124. The input of the one or more paddle shifters 126 may indicate whether the shift position is upshifted or downshifted. Changing the shift position of the transmission 124 of the vehicle 102 changes the gears of the transmission 124. For example, pulling a paddle shifter may upshift the shift position and pushing the paddle shift may downshift the shift position. In another example, moving one paddle shifter may upshift the shift position and moving another paddle shifter may downshift the shift position.

The sound enhancement system 100 may determine the shift position (210). The sound enhancement system 100 may determine the shift position when a paddle shift is detected. The sound enhancement system 100 may use a shift position sensor 116*f* to detect the shift position of the transmission 124. The shift position may affect the amount of airflow into the engine 122 and the engine speed of the vehicle 102, and so, the sound enhancement system 100 may need to adjust the magnitude of the audio signal that is generated.

Figure 3:
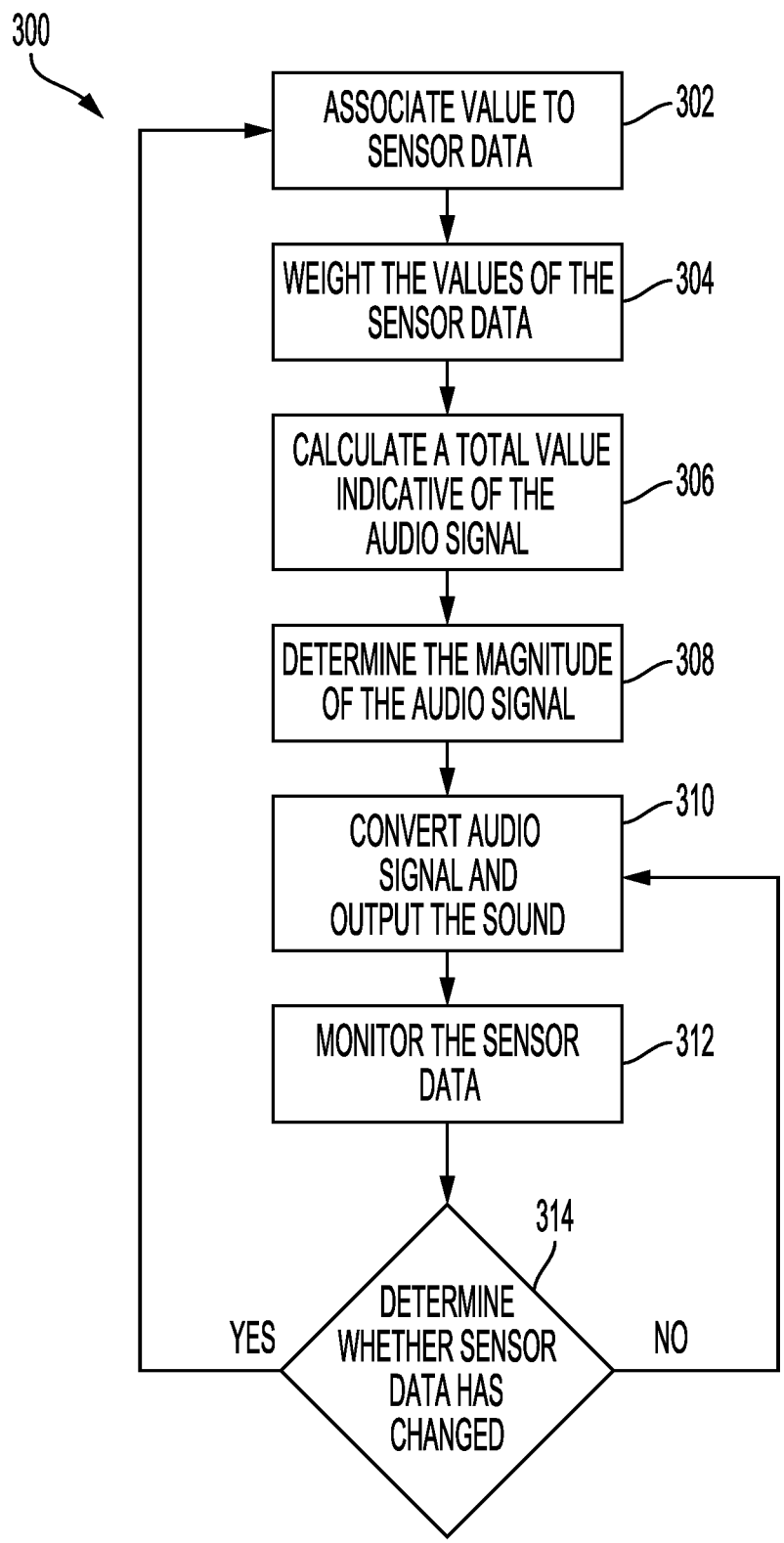
FIG. 3 is a flow diagram of an example process for determining the magnitude of the audio signal, and consequently the volume of the outputted sound using the engine sound enhancement system of FIG. 1 according to an aspect of the invention.

The sound enhancement system 100 determines a magnitude of an audio signal that is to be generated and later converted and outputted as audio to mimic or further enhance the engine sound of the vehicle 102 (212). The sound enhancement system 100 determines the magnitude of the audio signal based on the amount or the rate of the airflow, the engine speed, the engine torque, the engine throttle position, the shift position, the tow mode, and/or the accelerator pedal position. The sound enhancement system 100 may use one or a combination thereof of the sensor data to determine the magnitude of the audio signal. For example, the sound enhancement system 100 may use solely the amount or the rate of the airflow to calculate the magnitude of the audio signal or may use a combination thereof to determine the magnitude of the audio signal. The use of the airflow to determine the magnitude of the audio signal may be independent of the other factors, such as the accelerator pedal position. The magnitude of the audio signal corresponds to a volume of the sound of the audio signal emitted from the audio device 112. FIG. 3 further describes the process 300 for determining the magnitude of the audio signal, and consequently, the volume of the outputted sound.

Once the magnitude of the audio signal is determined, the sound enhancement system 100 may determine a timing of when to output the audio (214). The sound enhancement system 100 may determine when to output the audio signal so that the output of the audio coincides with the throttling of the engine so that the outputted audio mimics or further enhances the engine sound of the vehicle 102 and forms a natural sound that coincides with the throttling of the engine and movement of the vehicle 102. The timing of when to output the audio may be based on the sensor data, such as the amount or the rate of the airflow, the engine speed, the engine torque, the engine throttle position, the shift position, the tow mode, and/or the accelerator pedal position. In particular, the sound enhancement system 100 may use the amount or the rate of the airflow to determine the timing because the airflow more closely corresponds, coincides or matches the vehicle behavior and response. For example, if the sound enhancement system 100 were to rely solely on the accelerator pedal, engine torque, engine speed and/or engine throttle positions, the output of the audio would not match the vehicle response, and instead, the audio would be outputted prior to the vehicle moving. By using the airflow measurements, the timing may more closely coincide with the vehicle behavior such that the sound enhancement system 100 outputs the audio to match the vehicle behavior, e.g. when the amount and/or rate of airflow is greater than or equal to a threshold amount to move the wheels of the vehicle 102. By determining the timing, the audio may be outputted such that the outputted audio does not happen before enough air flows into the engine and there is enough engine torque to move the wheels of the vehicle 102.

With the magnitude and the timing of when to output the audio signal determined, the sound enhancement system 100 generates the audio signal (216). The audio signal that is to be outputted may mimic or further enhance the engine sound of the vehicle 102. The sound enhancement system 100 may generate the audio signal based on the magnitude of the audio signal and the timing of when to output the audio signal. For example, the audio signal is generated when the timing is reached. The sound enhancement system 100 may delay the generation of the audio signal so that that the output of the audio coincides with and corresponds to the throttling of the engine 122, and subsequent, powering of the wheels of the vehicle 102. Thus, a more natural engine sound is outputted.

The sound enhancement system 100 may obtain or determine the type or kind of audio to be generated (218). The sound enhancement system 100 may obtain or download the type or kind of audio from the external database 104. The sound enhancement system 100 may select the type or kind of audio based on the type or kind of engine 122 and/or the type or kind of the vehicle 102. In some implementations, the sound to be generated may be pre-programmed or stored within the memory 108.

The sound enhancement system 100 converts the audio signal into audio and outputs the audio (220). The sound enhancement system 100 may use the audio device 112, such as an audio sound transducer, to convert the audio signal into audio and output the audio, such as via a speaker. For example, the magnitude of the audio signal may correspond to a volume for the audio. The magnitude of the audio signal and the volume of the audio may be directly proportional. As the magnitude of the audio signal increases, the volume of the audio also increases. And as the magnitude of the audio signal decreases, the volume of the audio also decreases.

FIG. 3 is a flow diagram of a process 300 for determining the magnitude of the audio signal, and consequently, the volume of the outputted audio. One or more computers or one or more data processing apparatuses, for example, the ECU 106 of the sound enhancement system 100 of FIG. 1, appropriately programmed, may implement the process 300.

The sound enhancement system 100 may assign or associate a value to each of the sensor data, such as the amount or the rate of airflow, the engine torque, the engine speed, the throttle position, the accelerator pedal position, the shift position, the tow mode, and/or a combination thereof (302). The value of each of the sensor data may be based on the magnitude of the measurement or the position detected. For example, a greater amount or rate of airflow may correspond to a greater assigned value representative of the airflow and a lesser amount or the rate of the airflow corresponds to a lesser assigned value representative of the airflow. In another example, a greater engine speed corresponds to a greater assigned value representative of the engine speed and a lesser engine speed corresponds to a lesser assigned value representative of the engine speed. Further, a greater trailer brake gain may correspond to a greater assigned value representative of the trailer brake gain setting and a lesser trailer brake gain may correspond to a lesser assigned value representative of the trailer brake gain setting.

Figure 5:
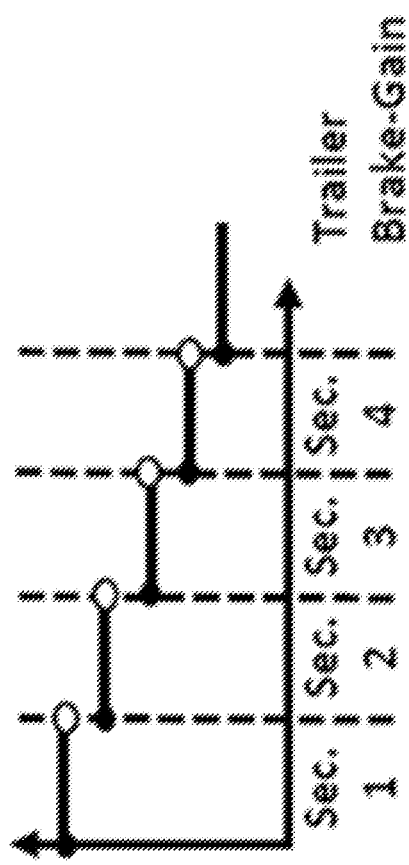
FIG. 5 shows an example graph of determining a trailer brake gain and the corresponding volume of the outputted sound using the engine sound enhancement system of FIG. 1 according to an aspect of the invention.

The sound enhancement system 100 may weight the values indicative of the sensor data (304). The sound enhancement system 100 may prioritize or weight the values indicative of the sensor data. A greater weight may be associated and applied to the values indicative of the sensor data that is most representative of the magnitude of the audio signal. For example, since the amount of airflow and/or the rate of the airflow best corresponds and coincides with the natural engine sound of the engine 122 as it relates to the timing of the natural engine sound and the volume of the natural engine sound emitted, the sound enhancement system 100 may assign a greater weight to the value indicative of the amount of airflow and/or the rate of the airflow in comparison to the other sensor data, such as the position of the accelerator pedal, the engine torque, the engine speed and/or the engine throttle position. In various embodiments, the sound enhancement system 100 may assign a greater weight to the value indicative of the trailer brake gain due to the amount of strain and/or brake pressure being applied corresponds and coincides with the natural engine sound of the engine 122 as it relates to the timing of the natural engine sound and the volume of the natural engine sound emitted. Further, different values may be assigned to the range of trailer brake gain. For instance, as illustrated in FIG. 5, a greater trailer brake gain value may correspond with a lesser engine sound enhancement (e.g., a lesser magnitude, a lesser volume level).

Once each of the values indicative of the sensor data are weighted, the sound enhancement system 100 may calculate a total value indicative of the sensor data used to determine the magnitude and timing of the audio signal (306). The sound enhancement system 100 may calculate a total value based on a function of the values indicative of each of the sensor data and the weights associated with each of the sensor data. For example, each weight may correspond and be used as a multiplier of each value indicative of the corresponding sensor data. Then, the sound enhancement system 100 may sum the weighted values to form the total value indicative of the sensor data.

The sound enhancement system 100 determines the magnitude of the audio signal (308). The magnitude of the audio signal may be based on the total value indicative of the sensor data. The magnitude of the audio signal may directly correspond with the total value indicative of the sensor data. For example, a larger total value may correspond to a larger magnitude for the audio signal, which translates to a higher volume for the audio. In another example, a smaller total value may correspond to a smaller magnitude for the audio signal, which translates to a lower volume for the audio. The magnitude may be based on a mapping, which may be stored in the memory 108, between the total value and corresponding magnitudes.

In some implementations, the magnitude may be an average of the total value indicative of the sensor data over a period. This allows the sound enhancement system 100 to gradually and smoothly transition from one magnitude determined at one point of time and another magnitude determined at a subsequent point of time, which results in a steady transitioning of the audio when increasing or decreasing.

The sound enhancement system 100 converts the audio signal and outputs the audio that is converted from the audio signal, as described above (310). The sound enhancement system 100 may use an audio device 112 to convert the audio signal to audio, such as by using an audio sound transducer, and output the audio, such as by using a speaker. Once the audio is output, the sound enhancement system 100 may continue to monitor the sensor data (312). The sound enhancement system 100 may continue to monitor the sensor data to determine or detect any changes and continue the calculation and determination of the values of the audio signal to formulate any adjustments to the volume of the audio that is generated and output.

The sound enhancement system 100 may determine whether the sensor data has changed (314). The sound enhancement system 100 continues to generate the audio signal, convert the audio signal to audio and output the audio. When the sensor data has changed, the sound enhancement system 100 re-calculates each value indicative of each sensor data and re-calculates the total value of the sensor data to re-generate the audio signal and corresponding audio. When the sensor data has not changed, the sound enhancement system 100 continues to output the audio associated with the audio signal.

Figure 4:
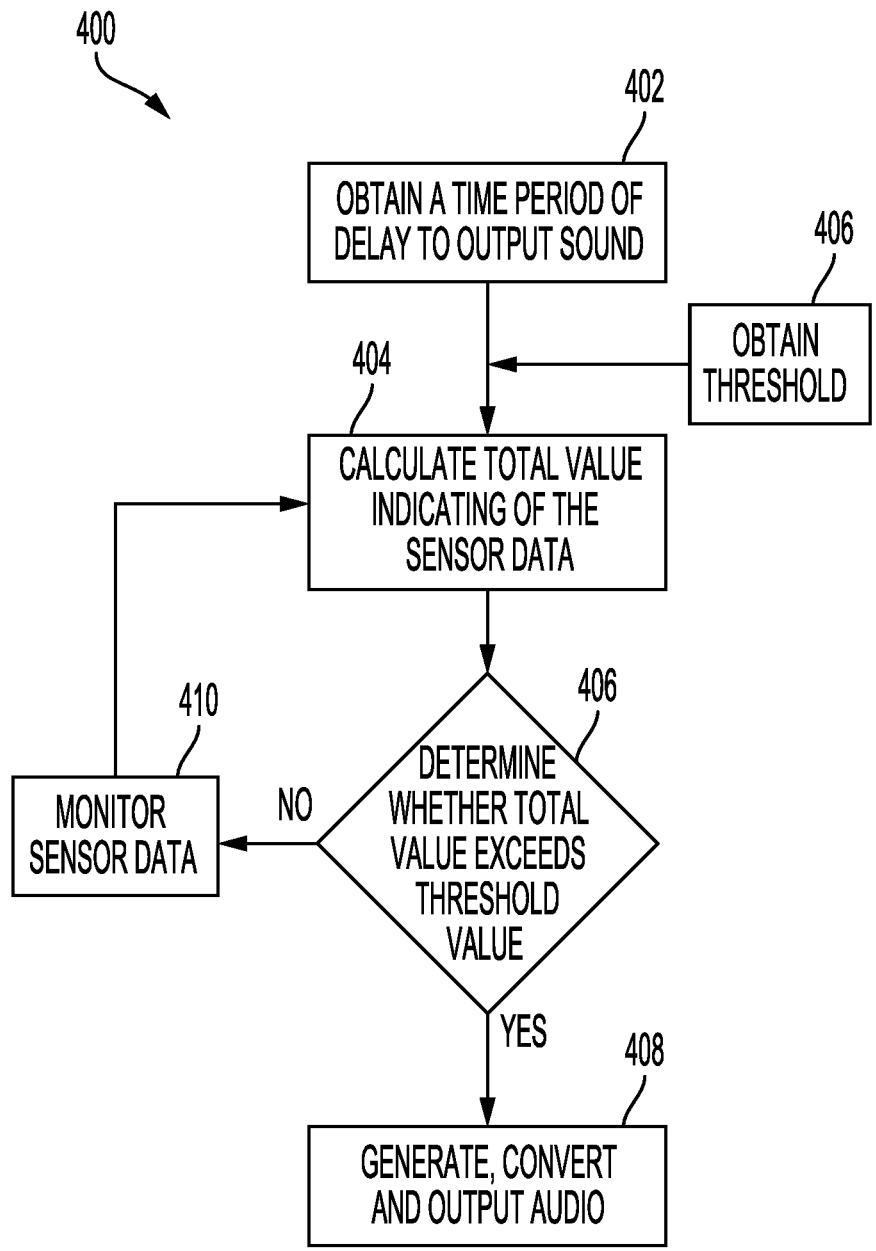
FIG. 4 shows a flow diagram of an example process for determining the timing of when to output the audio using the engine sound enhancement system of FIG. 1 according to an aspect of the invention.

FIG. 4 further describes the process 400 for determining the timing of when to output the audio. One or more computers or one or more data processing apparatuses, for example, the ECU 106 of the sound enhancement system 100 of FIG. 1, appropriately programmed, may implement the process 400. Once the sound enhancement system 100 detects the sensor data, the sound enhancement system 100 may determine a timing of when to generate the audio signal and output the sound associated with the audio signal to match the powering of the wheels more closely of the vehicle 102. The timing may be a static delay and/or a dynamic delay that is based on the sensor data.

The sound enhancement system 100 may obtain a period of delay (e.g., 1 second) to output the audio that mimics or enhances the engine sound (402). The period of delay may be user-configured, pre-determined, such as a factory setting, user-inputted and/or calculated. The period of delay may be used to determine the timing of when to generate the audio signal and output the corresponding sound. The period of delay may be between 50 milliseconds and 2 seconds, for example.

The sound enhancement system 100 may obtain a threshold value (404). The threshold value may represent the timing, e.g., a delay, of when to generate the audio signal, convert the audio signal to audio and output the audio. The threshold value may be user-inputted, pre-determined and/or obtained from the memory 108.

The sound enhancement system 100 may calculate the total value indicative of the sensor data, as described above (404). The sound enhancement system 100 may determine whether the total value exceeds the threshold value (408). The sound enhancement system 100 may compare the total value indicative of the sensor data to the threshold value.

When the total value exceeds the threshold value, e.g., greater than the threshold value, the sound enhancement system 100 generates the audio signal, converts the audio signal to audio, and outputs the audio, as described above (410). In some implementations, the sound enhancement system 100 may have already generated the audio signal and may only need to convert and output the audio. The timing of when the total value exceeds the threshold value may indicate that the engine 122 has been throttled enough to power and/or move the wheels of the vehicle 102. As such, the sound enhancement system 100 may generate the audio signal, convert the audio signal and/or output the audio to mimic or further enhance the engine sound. Since the output of the audio has been delayed until the total value exceeds the threshold value, the outputted audio coincides with the movement of the wheels. This creates a more natural engine sound.

Otherwise, when the total value does not exceed the threshold value, the sound enhancement system 100 may not generate the audio signal and/or output the audio. The sound enhancement system 100 may continue to monitor the sensor data until the calculated total value indicative of the sensor data exceeds the threshold (412).

In some implementations, the sound enhancement system 100 generates the audio signal, converts the audio signal and outputs the corresponding audio based on the period of delay. The sound enhancement system 100 delays the generation of the audio signal or the output of the audio for the period, and then, generates the audio signal and/or outputs the audio.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A sound enhancement system for a vehicle, comprising:
   a trailer brake sensor configured to determine a trailering load attached to the vehicle;
   an electronic control unit coupled to the trailer brake sensor and configured to:
      determine the vehicle is operating in a tow mode based on the trailer brake sensor,
      determine a magnitude of an audio signal that mimics or enhances engine sound based on the tow mode, and
      generate the audio signal; and
   an audio device configured to output the audio signal based at the determined magnitude.

2. The sound enhancement system of claim 1, wherein the vehicle is a towing vehicle configured to tow a towed vehicle, the towing vehicle and the towed vehicle being coupled together.

3. The sound enhancement system of claim 2, wherein the trailer brake sensor is further configured to determine a mass being towed, a brake type, whether the braking of the towed vehicle should be increased, decreased or is correct, and whether a key is connected to or has been disconnected from a switch.

4. The sound enhancement system of claim 3, wherein the electronic control unit is configured to receive a signal indicating that the towed vehicle is disconnected from the towing vehicle in response to the switch being disconnected from the key receives.

5. The sound enhancement system of claim 2, wherein the electronic control unit is configured to adjust a trailer brake gain.

6. The sound enhancement system of claim 5, wherein the electronic control unit is further configured to determine the magnitude of the audio signal that mimics or enhances engine sound based on the trailer brake gain.

7. The sound enhancement system of claim 6, wherein a greater trailer brake gain corresponds to a greater magnitude of the audio signal.

8. The sound enhancement system of claim 1, further comprising:
   an airflow sensor configured to measure an airflow into an engine of the vehicle, and
   wherein the electronic control unit is configured to generate the audio signal further based on the airflow.

9. The sound enhancement system of claim 8, wherein an increase in the airflow into the engine corresponds to an increase in the magnitude of the audio signal and a decrease in the airflow into the engine corresponds to a decrease in the magnitude of the audio signal.

10. The sound enhancement system of claim 7, wherein the audio device is a speaker in an interior of the vehicle and the speaker is configured to output sound converted from the audio signal into the interior of the vehicle; and
   wherein an increase in the magnitude of the audio signal corresponds to an increase in volume of the outputted sound via the speaker and a decrease in the magnitude of the audio signal corresponds to a decrease in the volume of the outputted sound via the speaker.

11. An engine sound enhancement system for a vehicle, comprising:
   a trailer brake sensor configured to detect a tow status placed on the vehicle;
   an airflow sensor configured to measure an airflow into an engine of the vehicle;
   an electronic control unit coupled to the trailer brake sensor and the airflow sensor, and configured to:
      determine a magnitude of an audio signal that mimics or enhances engine sound of the vehicle to be outputted based on the tow status and the airflow into the engine,
      determine a timing of when to output the audio signal based on the airflow into the engine of the vehicle, and
      generate the audio signal based on determined magnitude; and
   a speaker positioned within an interior of the vehicle and configured to output the audio signal based on the timing of when to output the audio signal.

12. The engine sound enhancement system of claim 11, wherein the audio signal is generated independently of a depression of an accelerator pedal of the vehicle.

13. The engine sound enhancement system of claim 11, further comprising:
   a speed sensor configured to measure a rotation speed of an engine of the vehicle;
   a torque sensor configured to measure an amount of engine torque; and
   wherein the electronic control unit is configured to determine the magnitude of the audio signal further based on the rotation speed of the engine of the vehicle and the amount of engine torque.

14. The engine sound enhancement system of claim 11, further comprising:
   an accelerator pedal sensor configured to measure a position of an accelerator pedal of the vehicle; and
   wherein the electronic control unit is configured to determine the magnitude of the audio signal further based on the position of the accelerator pedal.

15. The engine sound enhancement system of claim 11, further comprising:
   one or more paddle shifters configured to upshift or downshift to a gear of a transmission of the vehicle into a shift position; and
   wherein electronic control unit is configured to determine the magnitude of the audio signal further based on the gear of the transmission.

16. The engine sound enhancement system of claim 11, wherein an increase in the airflow into the engine corresponds to an increase in a magnitude of the audio signal and a decrease in the airflow into the engine corresponds to a decrease in a magnitude of the audio signal; and
   wherein the increase in the magnitude of the audio signal corresponds to an increase in a volume of the outputted signal via the speaker and the decrease in the magnitude of the audio signal corresponds to a decrease in the volume of the outputted signal via the speaker.

17. The engine sound enhancement system of claim 11, wherein the electronic control unit is further configured to:
adjust a trailer brake gain, and
determine the magnitude of the audio signal that mimics or enhances engine sound based on the trailer brake gain, wherein a greater trailer brake gain corresponds to a lesser magnitude of the audio signal.

18. A method for outputting an engine sound, comprising:
determining, by a trailer brake control unit, a vehicle is operating in a tow mode;
determining, by a processor, a magnitude of an audio signal that is to be generated and that mimics or enhances engine sound of the vehicle based on the tow mode;
generating, by the processor, the audio signal based on the determined magnitude; and
outputting, via a speaker positioned within an interior of the vehicle, the generated audio signal.

19. The method of claim 18, further comprising:
measuring, using an airflow sensor, an amount or a rate of airflow into an engine of the vehicle;
determining, by the processor, the magnitude of the audio signal based on the amount or the rate of airflow into the engine; and
determining, by the processor, a timing of when to output the audio signal based on the airflow into the engine of the vehicle and the tow mode.

20. The method of claim 18, further comprising:
adjusting a trailer brake gain; and
determining the magnitude of the audio signal based on the trailer brake gain, wherein a greater trailer brake gain corresponds to a lesser magnitude of the audio signal.

* * * * *